(12) United States Patent
Stevens et al.

(10) Patent No.: US 9,807,628 B2
(45) Date of Patent: Oct. 31, 2017

(54) NETWORK ACCESS FAULT REPORTING

(71) Applicant: BRITISH TELECOMMUNICATIONS PUBLIC LIMITED COMPANY, London (GB)

(72) Inventors: Timothy S Stevens, London (GB); Andrew G Davis, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/039,152

(22) PCT Filed: Oct. 31, 2014

(86) PCT No.: PCT/GB2014/000442
§ 371 (c)(1),
(2) Date: May 25, 2016

(87) PCT Pub. No.: WO2015/079195
PCT Pub. Date: Jun. 4, 2015

(65) Prior Publication Data
US 2016/0360430 A1    Dec. 8, 2016

(30) Foreign Application Priority Data
Nov. 28, 2013  (EP) .................... 13250117

(51) Int. Cl.
*H04W 12/08*    (2009.01)
*H04W 8/30*    (2009.01)
(Continued)

(52) U.S. Cl.
CPC .......... *H04W 24/04* (2013.01); *H04L 63/08* (2013.01); *H04L 63/10* (2013.01); *H04W 8/30* (2013.01);
(Continued)

(58) Field of Classification Search
CPC ....... H04W 8/30; H04W 12/06–12/08; H04W 24/04
See application file for complete search history.

(56) References Cited

U.S. PATENT DOCUMENTS

| 2005/0086346 A1 | 4/2005 | Meyer |
| 2009/0117852 A1 | 5/2009 | Loh |

(Continued)

FOREIGN PATENT DOCUMENTS

| CN | 2012/139360 | 10/2012 |
| CN | 102740337 | 10/2012 |

(Continued)

OTHER PUBLICATIONS

International Search Report for PCT/GB2014/000442, mailed Jan. 22, 2015, 6 pages.
Search Report for EP 13250117, dated Jul. 18, 2014, 2 pages.

*Primary Examiner* — Marcus R Smith
(74) *Attorney, Agent, or Firm* — Nixon & Vanderhye P.C.

(57) ABSTRACT

A loss of connection between a wireless access point and a network is reported to a network-based service platform by the wireless access point by automatically establishing wireless contact with a second wireless access point, and transmits a predetermined fault report message to a predetermined network platform address by way of the second wireless access point and the second network interface. Authentication credentials are stored in the access point allowing automatic access to the service platform without user intervention, to allow the report to be generated without user intervention. The message may include data on recent usage of the access point, or may be repeated when a user attempts to use the access point, in order to prioritize the fault reported at the service platform.

9 Claims, 5 Drawing Sheets

(51) Int. Cl.
*H04W 24/04* (2009.01)
*H04L 29/06* (2006.01)
*H04W 12/06* (2009.01)
*H04W 24/10* (2009.01)
*H04W 36/08* (2009.01)
*H04W 76/02* (2009.01)
*H04W 76/06* (2009.01)
*H04W 88/08* (2009.01)
*H04W 84/04* (2009.01)

(52) U.S. Cl.
CPC ........... *H04W 12/06* (2013.01); *H04W 12/08* (2013.01); *H04W 24/10* (2013.01); *H04W 36/08* (2013.01); *H04W 76/02* (2013.01); *H04W 76/06* (2013.01); *H04W 84/045* (2013.01); *H04W 88/08* (2013.01)

(56) References Cited

U.S. PATENT DOCUMENTS

| | | |
|---|---|---|
| 2009/0245163 A1 | 10/2009 | Inoue |
| 2010/0190533 A1 | 7/2010 | Black et al. |
| 2011/0078763 A1* | 3/2011 | Kan ........................ H04L 41/28 726/3 |
| 2011/0294492 A1* | 12/2011 | Hsu ........................ H04W 24/02 455/422.1 |
| 2012/0002537 A1 | 1/2012 | Bao et al. |
| 2015/0023155 A1* | 1/2015 | Shanmugavadivel .. H04L 45/28 370/225 |
| 2015/0312841 A1* | 10/2015 | Sirotkin ............... H04W 40/246 370/254 |
| 2015/0365959 A1* | 12/2015 | Coldrey ................ H04W 24/04 370/252 |

FOREIGN PATENT DOCUMENTS

| | | |
|---|---|---|
| EP | 2 230 864 | 9/2010 |
| GB | 2478978 | 9/2011 |
| WO | WO 2008/082587 | 7/2008 |
| WO | WO 2010/077002 | 8/2010 |
| WO | WO 2011/134039 | 11/2011 |
| WO | WO 2012/050496 | 4/2012 |
| WO | WO 2012/139360 | 10/2012 |
| WO | 2014/083296 | 6/2014 |

* cited by examiner

NETWORK ACCESS FAULT REPORTING

This application is the U.S. national phase of International Application No. PCT/GB2014/000442 filed 31 Oct. 2014, which designated the U.S. and claims priority to EP Patent Application No. 13250117.2 filed 28 Nov. 2013, the entire contents of each of which are hereby incorporated by reference.

BACKGROUND AND SUMMARY

This invention relates to connection of data terminals to a data network through wireless access points, and in particular to fault reporting in the event of failure of a primary connection between an access point and the data network.

Connection to data networks such as the Internet has become an integral part of many domestic and small business activities. The rapid wide-scale adoption of this technology by domestic and small to medium business enterprises had been facilitated by the use of the pre-existing fixed telephone network to connect the customer premises to the network. Such lines use a wide variety of technologies ranging from modern optical fibre-to-the-premises, to older electrical connections using copper (and even aluminium) lines, with joints & junctions. Even these older lines are in many cases capable of delivering broadband internet services, although many were never designed to do so.

However, all types of line may develop faults that may either completely interrupt the signals, or may only permit a degraded service (voice but no broadband, intermittent faults etc.). Additionally, faults and failures may occur in the broadband service despite the underlying network being apparently fault-free. There are two classes of such faults, referred to here as "hard" and "soft". Hard faults have some physical cause, where the transmission properties of the line are affected. One such example is when the ringing of an incoming telephony call can cause the broadband signal to be lost. Soft faults may be caused by network-level authentication failures, software or database problems in the ISP's equipment, configuration or billing issues etc. Whilst it is important that all faults are identified and rectified, intermittent faults such as these may be particularly costly for the ISP, and annoying for the customer. Furthermore, in a deregulated market the physical line may be provided by one operator and the internet service by another. In such a case, it may be unclear in the event of a failure which provider is responsible, or even to whom the fault should be reported.

Typically, one or more user terminals will connect to the public network through a local area network (LAN) controlled by a access point, which mediates data messages between the user terminal and the internet, including providing modem functions. Connection between the terminal and the access point may be by an Ethernet or Powerline connection, but increasingly wireless connection is used (a Wireless Local Area Network "WLAN") as this allows terminals to be placed anywhere within wireless range of the access point.

Terminals connected to the same access point may also communicate between each other without going through the external network. To provide privacy for such activity, and to ensure the access point is not misused by unauthorised persons to gain access to the internet, access points typically have access protection to ensure only users with the correct access credentials can use it.

Public wireless access points also exist which allow any users with appropriate terminal equipment to connect to the Internet. These access points may be dedicated public access points provided by commercial enterprises to attract custom, or parts of the capacity of privately-owned access points made available to the public by their owners in exchange for reciprocal access rights to other participants' access points.

Failure of the primary connection between an access point and the network can be problematic as users have become reliant on their internet connections for many business and domestic purposes In many cases a service provider's help-desk, or a troubleshooting application, can guide the user to establish a replacement connection to the Internet through a public wireless access point whilst the fault in the primary connection is under repair.

Fault diagnostic systems have existed for many years, and generally involve making measurements of certain physical properties such as connectivity, impedance, leakage, frequency response etc Some of these tests can be performed entirely remotely, whilst others require test equipment to be present at both ends of the line. Therefore, whilst several types of fault can be automatically identified by the Internet Service Provider, there are other types that require the customer to detect and report them.

In some cases, the internet connection may fail despite the physical characteristics of the line appearing to be within normal limits, and voice calls operating correctly. There are other situations where the two services interact; for example ringing current may interrupt the broadband service. These latter faults may be particularly difficult to diagnose, owing to their intermittent nature, and the interaction of multiple services or network layers Many troubleshooting operations can be made available to the user on the Internet, but if it is the Internet connection itself which has failed, that information is not accessible unless the user has had the foresight to download it in advance. Consequently, such failures account for a very high proportion of calls to network operators' helpdesks—and even that course of action may not be available if the user's telephone line uses the same connection as the Internet connection, and the fault has affected both services.

Many wireless access points intended for small business or domestic use are supplied with two separate network interfaces: a private interface for the subscribed broadband service, and a public interface to provide access to subscribers to the public service. The two interfaces use the same fixed-line access connection, the architecture of the access point keeps the two interfaces completely separate, so that public-side users cannot access the private side of the access point, and also private traffic takes priority over public traffic.

In residential areas, there will typically be multiple access points visible, within wireless communication range of each other. These access points have to be aware of each other in order to select a channel on which to operate which is free from interference from neighbouring access points. If a user terminal can detect more than one access point, the access point to which the user has access rights to the private side has to be identified (either by a user input or by data stored on the user terminal) before connection can be attempted There would normally be no reason to wish to connect to the public side of an adjacent access point if a user is within range of his own, private access point. However in a fault situation, the public access offered by an adjacent line and access point could be useful, since it could be used to report the fault on the failed user's access point.

The applicant company's existing International Patent Application WO2014/083296 describes a process for connecting a failed line's access point to an adjacent public access point in order for the failed line's user to maintain internet access. He may use this access to report the faulty access point. However, this requires the user to initiate the process. Consequently if a fault develops when a user is not present, he will not discover the fault until he wishes to use the internet connection.

According to the present invention, there is provided a wireless access point having a wireless interface and a network interface, and an access control system for controlling communication by way of the wireless interface, and comprising a monitor for detecting a loss of connection to a network at the network interface, wherein the access control system is arranged to establish wireless connection through the wireless interface and a further wireless access point to a network-based service centre and to transmit a message to the service centre indicative of the loss of connection The wireless access point preferably has a store for authentication data, allowing communication with the network-based service centre to be established automatically.

Another aspect of the invention provides a method of reporting to a network-based service platform a loss of connection between a network connection of a wireless access point and a network, wherein, when the wireless access point detects a loss of connection at the network interface, it establishes wireless contact with a second wireless access point, having a second network interface, and transmits a predetermined fault report message to a predetermined network platform address by way of the second wireless access point and the second network interface.

Typically, a fault report message is transmitted by way of a network-based access control system, which is arranged to normally perform an authentication process on messages received from the second wireless access point. The network based access control system may be arranged to over-ride the authentication process for messages received from the network directed to the predetermined network platform address such that the message may be forwarded to the predetermined platform without authentication. Accordingly, one embodiment of the invention also provides a network-based service platform for a communications network comprising a fault reporting system configured to receive reports of network faults, each report including data identifying a network address from which the report originates, the platform comprising an authentication processor for exchanging data with a client terminal from which the fault report originates to identify the origin and location of the fault report and to confirm its authenticity. The service platform may also provide other services, for which a user interaction is required to provide authentication before access is permitted. To allow automatic fault reporting, the network-based service platform preferably incorporates an access control system for mediating requests from access points for transmission to the service platform, the access control system being arranged to perform a first authentication process to control access to a plurality of services provided by the service platform, and arranged such that the authentication process is over-ridden for requests to the fault reporting system, thereby allowing automatic unauthenticated access to the fault reporting system, which can itself perform a second, automatic authentication process, sufficient to allow reporting of the fault and its acknowledgement. Such automatic access can be limited to a single transaction.

Alternatively, the wireless access point may be arranged to generate authentication data for this process automatically Preferably, the authentication data used for access to the predetermined network platform address is distinct from access data stored by the network access point for access to the network by user terminals connecting to the access point by way of the wireless interface, and may only provide limited access for a predetermined period Following detection of a loss of connection at the network interface, when a user terminal next establishes wireless connection with the wireless access point, the wireless access point may transmit a message to the user terminal over the wireless interface, to report the loss of network connection. This activity may also be used to trigger a further report to the service platform, indicative of the activity at the access point, allowing the fault to be prioritised at the service platform.

The initial report may also include data relating to recent activity of the access point, allowing heavily used access points to be prioritised.

This allows connection or service faults to be automatically reported even when the line itself has failed, provided the access point itself is still operational. It does this by identifying a public wireless access point within its range, and then temporarily connecting to the public wireless interface on the adjacent access point, and log a fault report by proxying through the adjacent access point.

This automatic fault reporting saves costs for the service provider as it reduces the need for a helpdesk, and may offer improved fault-fixing Additionally, some faults would be auto-reported before the customer even becomes aware of them: for example if the fault arises when the customer is asleep or away from home, providing the access point has been left powered up and connected. Consequently the fault can be identified, reported, and hopefully rectified, before the user next wishes to use the connection.

In situations where the internet service and physical telephone line are provided by different suppliers, auto-reporting could reduce customer confusion, and may simplify the processes of the two suppliers, since the report details may assist identifying the precise failure, as measurements can be made from both sides of the failed link The invention may be implemented by software installed in the access point, either on manufacture, or by subsequent upgrade of the programming of the access point by installation of software provided on a physical carrier (e.g. a CD-ROM) or by download over the internet connection It will be noted that the access point initiating the relay function may do so through any public access point still connected to the backhaul network. There is no requirement for that access point to be modified, nor indeed for it to have a private-side capability. It simply detects the initiating access point as if it were a normal user of the public wireless capability. The user's access point would be handled like any other public user, for example being allocated lower priority than any dedicated users of the public access point. However, a fault report, and any instructions sent to the user's access point for example to perform diagnostic tests, can be of relatively low bandwidth.

In the preferred embodiment the access point is configured to suspend advertising its presence whilst the backhaul connection is unavailable. This will prevent further wireless devices attempting to connect to it, and will also prevent "loops" occurring, so that, for example, if two neighbouring access points both lose their respective primary connections they will not each attempt to connect through the other

BRIEF DESCRIPTION OF THE DRAWINGS

An embodiment of the invention will now be described with reference to the drawings in which.

DETAILED DESCRIPTION OF PRESENT EXAMPLE EMBODIMENTS

Figure 1:
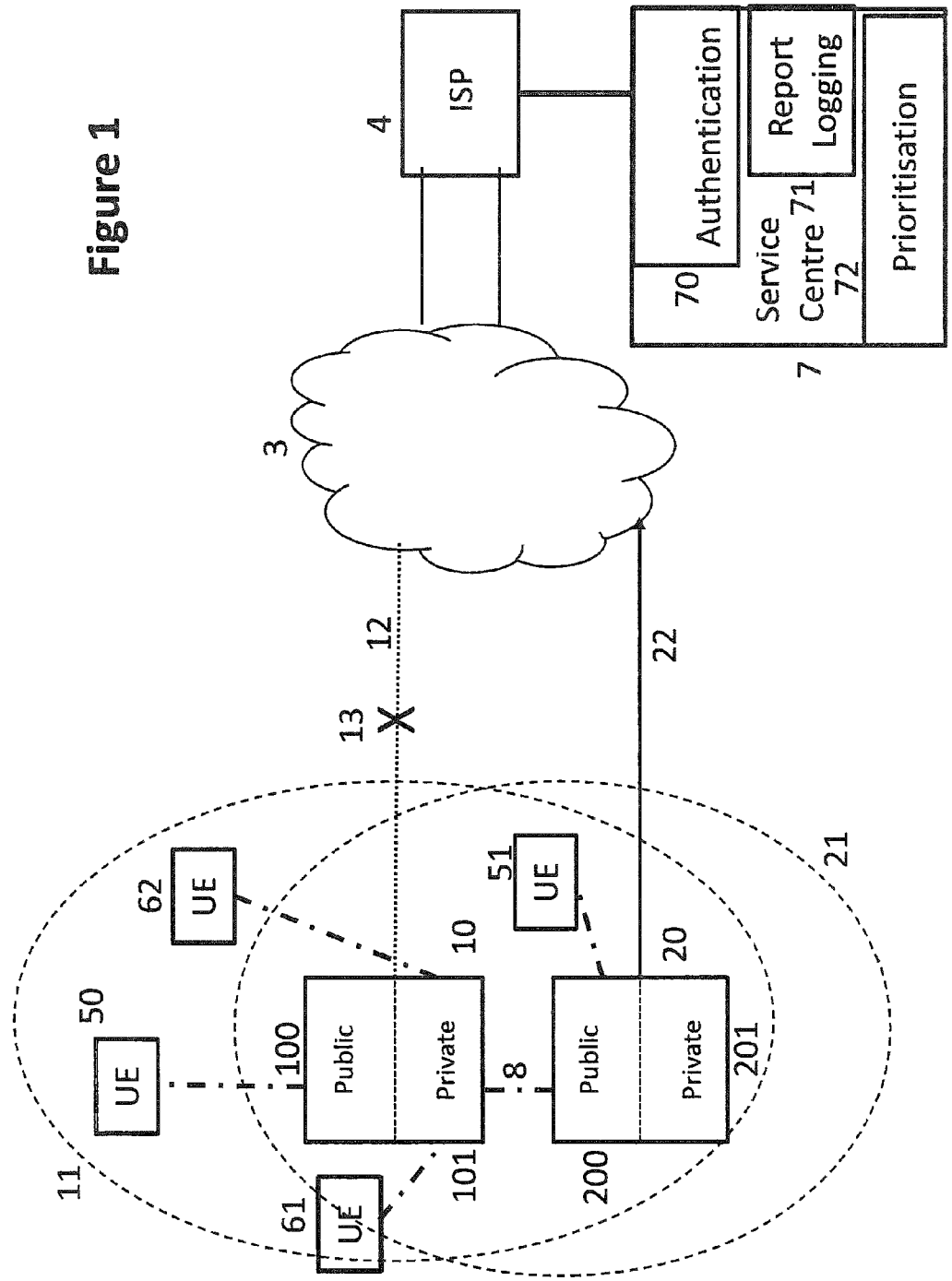
FIG. 1 illustrates a typical wireless LAN in which the invention may be implemented

FIG. 1 depicts a typical arrangement in which two premises each have a respective wireless access point 10, 20 installed The respective wireless ranges 11, 21 of these access points overlap, to the extent that each access point 10, 20 can detect the other. In practice, the access points 10, 20 may each be able to detect, and be detected by, several other access points.

Each access point 10, 20 has a respective fixed-line backhaul connection 12, 22 through a telecommunications network 3 to an internet service provider platform 4.

The access point 10 is arranged to provide wireless access facilities to individual user terminals using two separate functional interfaces, 100, 101. The first of these interfaces 100 is a public access facility, available to any user terminal 50 having an account with the service provider 4. The second interface 101 is a private access facility, available only to user terminals 61, 62 which can be authenticated as having access rights to that facility. Such authentication can be provided for example by use of a password known only to the owner of the respective wireless access point. The private interface 101 provide a more comprehensive service to those users 61, 62 authorised to use it than is provided by the public interfaces 100, for example by giving priority access to the available bandwidth, and allowing terminals 61, 62 connected to it to interwork as a wireless local area network (WLAN), independently of the internet (3, 4).

The second access point 20 also has a public access facility 200, accessible to terminals 51 within its wireless range 21. This second access point may be a public access "hotspot" provided by a network provider to provide extra wireless coverage in areas not otherwise adequately covered. However, more typically the second access point 20 will be similar to the first access point 10, installed on private premises neighbouring the premises in which the first access point 10 is installed, and will therefore also have a private access facility 201, accessible only to user terminals authenticated to that access point—in general these will not be the same user terminals as those authenticated to the first access point 10.

The private access facility 201 (if any) of this second access point 20 is not required for the operation of the invention by the first access point 10. However, as will become apparent, in a group of two or more such access points within wireless range of each other, any such access point 10, 20 capable of operating according to the invention will be able to report a fault on its fixed-line connection 12, 22 using any other such access point 20, 10 whose own fixed-line connection 22, 12 to the ISP 4 is still working.

In normal operation, a user terminal 61 would gain access to the internet 4 using the private (password-protected) interface 101 of the access point 10 with which it is associated, provided it is in range 11, and would only use the public interface 200 of another access point 20 if it is out of range of its own access point 10. Note that while the public interface 100, 200 typically allows a client to connect to the access point with no password required, the connected user will generally be limited to accessing a landing or challenge page at the ISP 4 unless he provides further access credentials.

Figure 2:
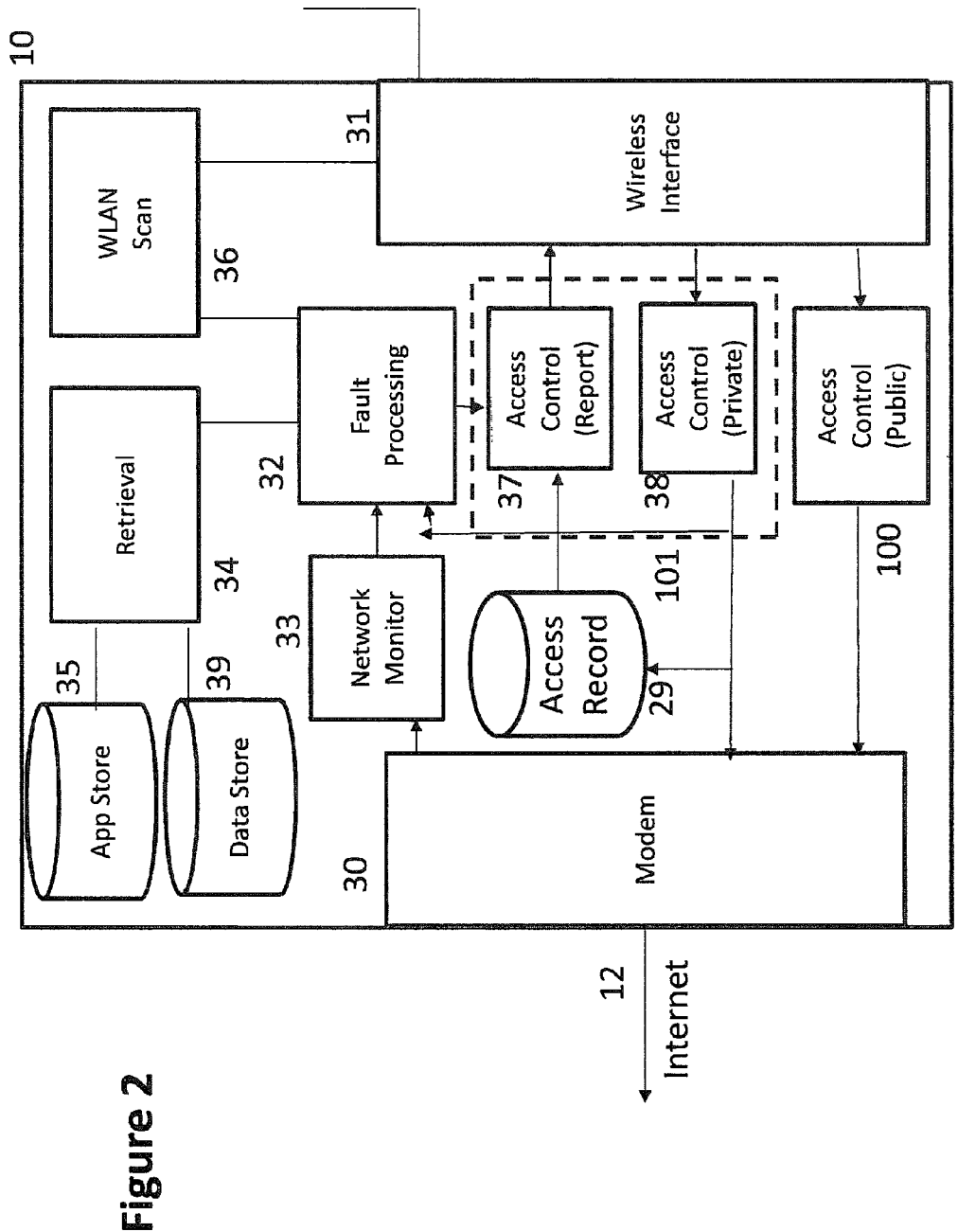
FIG. 2 illustrates the relevant functional elements of an access point in which the invention may be installed

FIG. 2 depicts the functional elements of the access point 10 that are relevant to the invention. It will be appreciated that these elements may be implemented in software, either installed in the access point on manufacture or downloaded subsequently. The access point 10 router comprises a modem/network interface 30 for connection to the internet 3 over a link 12, and a radio interface 31 for providing a wireless interface to one or more data terminals 50, 61, 62. Communication between the various interfaces 30, 31 of the router 3, and the terminals 50, 61, 62, is controlled by access control systems 100, 101 (38), respectively giving public and private access rights to user terminals requiring use of the access point.

In one embodiment of the invention, a store 29 is maintained which records the access attempts to the internet 4 made through the private access control system 38.

The condition of the network link 12 is monitored by a monitoring system 33. Also provided is a store 35 for data processing applications, which may be retrieved using a retrieval processor 34, and a further store 39 for authentication and identity data. In the preferred embodiment the store 35 is used to download programming information to a central processor controlling the operation of the access point, to allow it to operate as a fault reporting processor 32 in additional to its conventional functions, and in particular to allow the private-side access control system 101 to report line faults, as will be described.

The access point 10 also has a wireless access scanning function 36, allowing it to detect other wireless access points, such as the access point 20 depicted in FIG. 1 In normal use this scanning function is used to avoid selection of wireless channels already in use by neighbouring access points, to avoid interference, but when operating according to the invention it also allows the access point 10, to identify an access point 10 through which it can connect to the Internet when the fixed-line connection 12 is unavailable.

According to the invention, the private side access control system 101 is configured to operate in an additional mode 37, as well as the conventional mode 38 in which it provides access to a wireless local access network to any suitably authorised terminals 61, 62. This additional mode provides authentication processing to allow the automatic reporting of a line fault 13 to a central monitoring facility 7.

The central monitoring facility 7 includes an authentication processor 70, a fault logging processor 71, and a prioritisation processor 72, and its functioning will be described later.

The applications in the store 35 may be loaded in the access point 10 on manufacture, or downloaded from a service provider over the Internet 3 and connection 12 after installation, in order to upgrade its the operation and install new capabilities. The identity data in the store 39 may also be hard-wired into the terminal, downloaded from the network, or entered by the user from one of the terminals 61

In FIG. 1, a connection failure 13 is depicted on the line 12 between the first access point 10 and the ISP 4 Such a failure may be a physical break in the line, an intermittent fault, a service fault, or some other configuration error, the effect of which is to interrupt the customer's internet access.

In some cases the ISP 4 may be able to automatically detect this failure and/or it may be immediately apparent to the customer. However, in many other cases some function of the connection 12 (e.g voice telephony) may continue to function normally. In other cases the fault may occur when the user is not present, or not using the connection at the time Nevertheless, the access point 10 may itself detect the line or service fault 13 For example the line monitor 33 may transmit routine "Ping" or link status requests, DNS lookup probes, etc from the access point 10 to the ISP 4, and respond according to the receipt or otherwise of a response.

Figure 3:
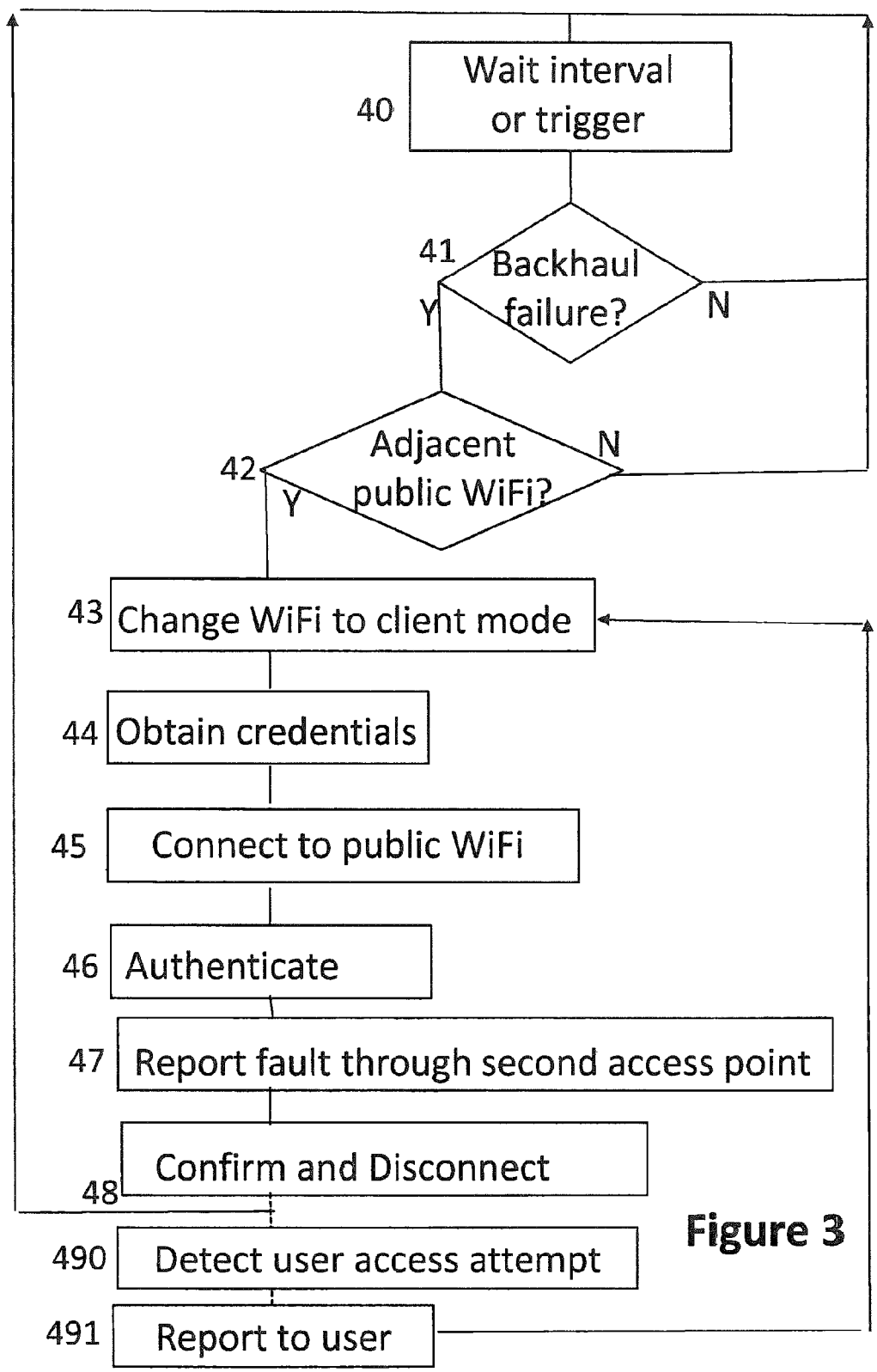
FIG. 3 is a flow diagram illustrating the process according to the invention.
Figure 4:
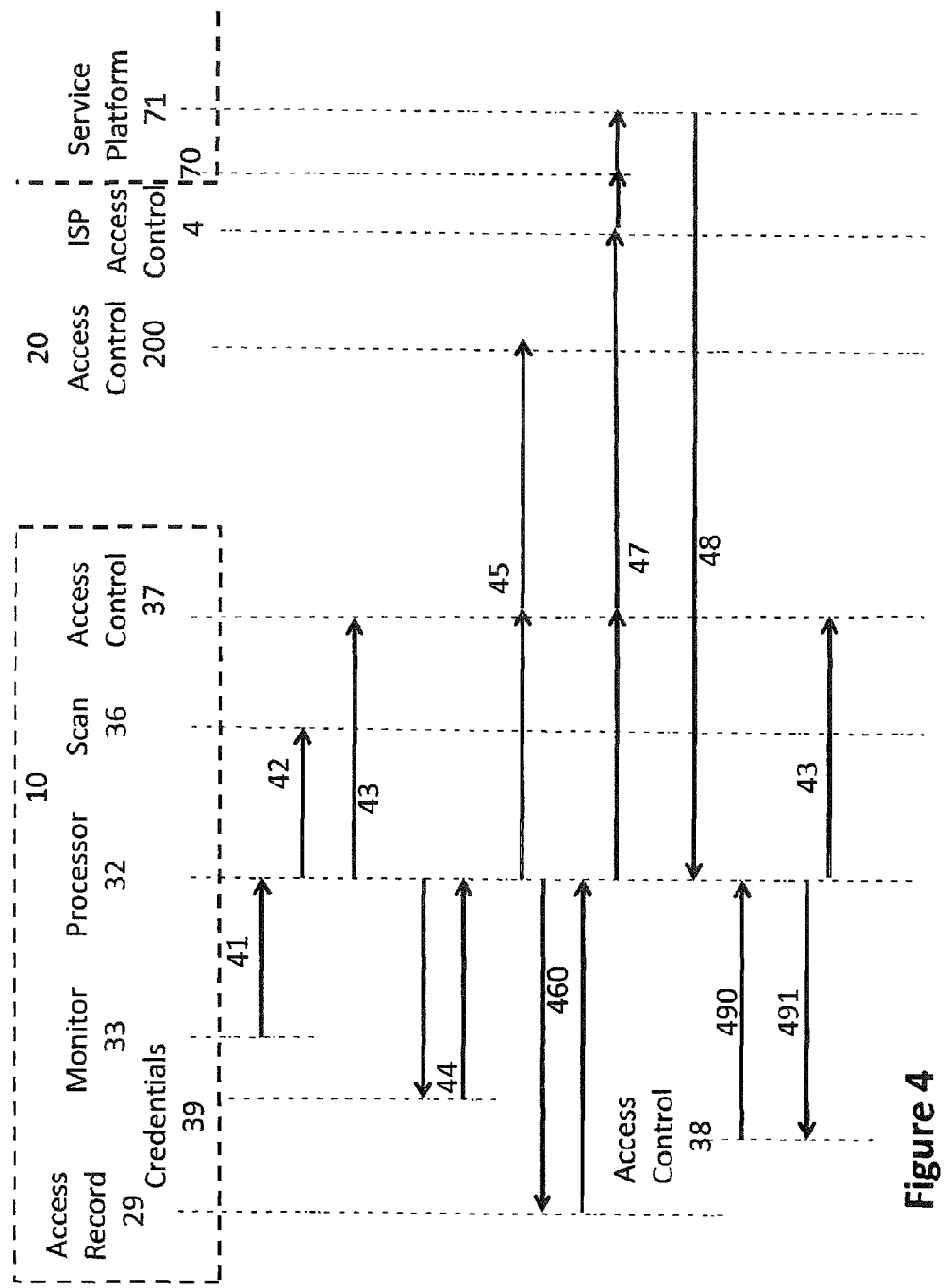
FIG. 4 is a sequence diagram indicating the interactions between the various elements which co-operate in the performance of a first embodiment of the invention.
Figure 5:
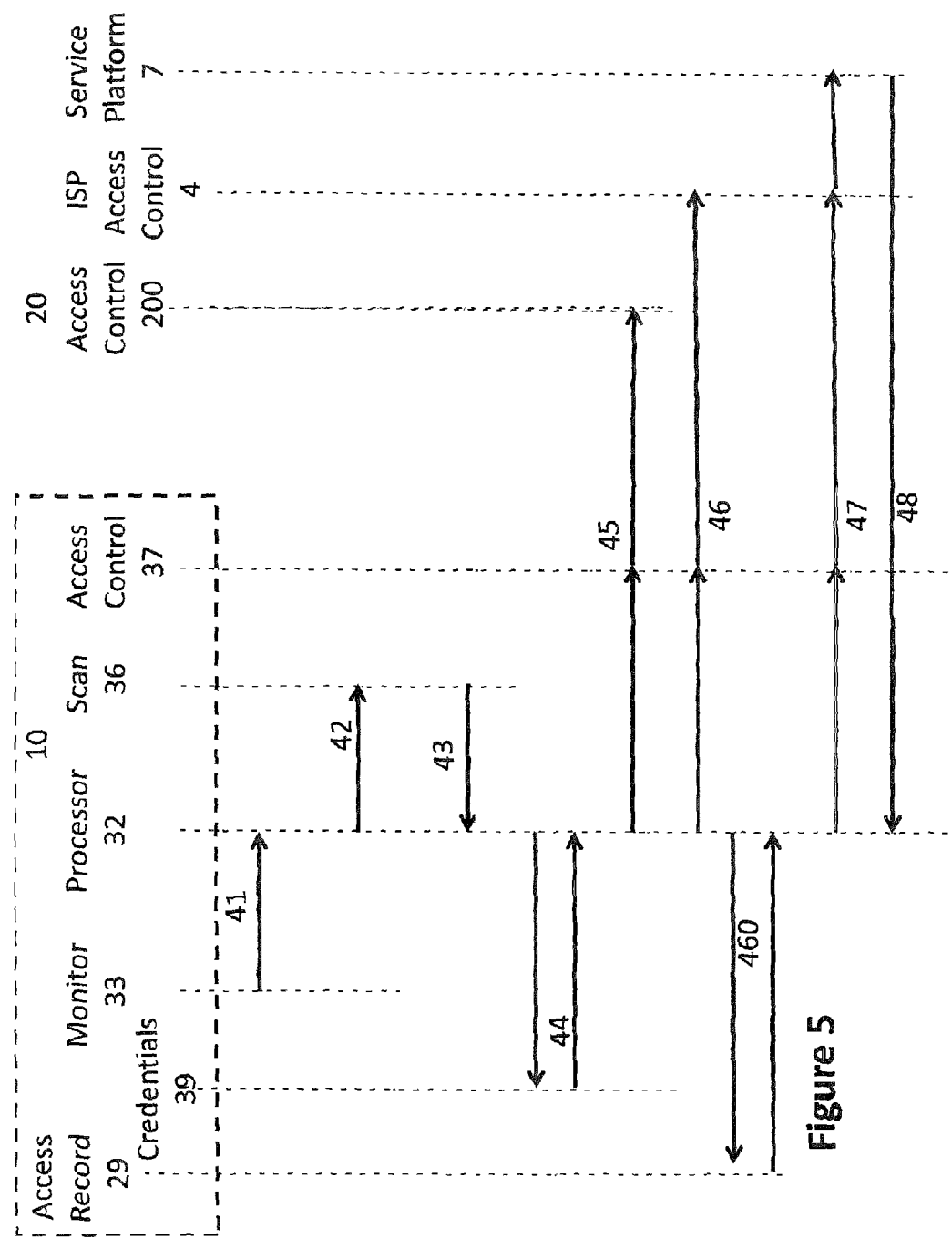
FIG. 5 is a sequence diagram indicating the interaction between the various elements which co-operate in the performance of a second embodiment of the invention.

FIGS. 3, 4 and 5 depict the process by which this embodiment operates, FIG. 5 being a variant of FIG. 4

The process begins when the network monitor 33 in the access point 10 detects a fault 13 in the fixed line connection 12 and reports it to the fault reporting processor 32 This may be a response to some change in characteristics, for example an abrupt change in electrical resistance in the line, indicating a break or short circuit, or it may be detected by the failure of a continuity test ("ping" or "heartbeat" test) (step 41).

Secondary tests may be performed before the initial alarm is acted upon. For example a transient fault may be logged, and further action only initiated if the fault recurs.

If no fault is detected, the fault processing function 32 remains in standby mode (step 40).

If a line fault has been detected (step 41) the wireless scanner 36 is used to detect whether there is another wireless access point 20 within range (step 42). In normal use, the data generated by the scanner 36 would be used to identify potential sources of interference, but in the present case, the fault reporting processor uses the data from the scanner 36 to identify a neighbouring access point 20 to which its own access point 10 can connect as if it were a user terminal 51.

If no suitable access point is detected, for example because there are none in the area, or they are all working to capacity, or the line fault 13 is also affecting neighbouring access points, the scanner 36 reverts to standby mode (step 40) The monitor 33 continues to test the line periodically (step 41) and, if the line fault 13 is still present (detected at step 41), the fault processor 32 makes further attempts to scan for a suitable access point 20 (step 42) until either the fault is rectified or connection to another access point 20 is achieved.

If the scan identifies a suitable access point 20, the fault reporting processor 32 now causes the first access point 10 to interact with the second access point 20 as if the first access point 10 were a typical roaming wireless terminal, similar to the operation of the terminal 51 depicted in FIG. 1. (Step 43) This requires the access control system 37 to operate the access point 10 in the way a user terminal does, by requesting a channel to be allocated to it by the second access point 20 and operating under the control of that access point 20. The access control function 37 in the first access point 10 thus operates as a user terminal working to the public-side interface 200 of the second access point 20.

The fault reporting processor 32 uses the access control function 37 to access the service platform 7 through the access point 20, and its fixed connection 22 to the ISP 4 As the access point 10 is now connected to the ISP 4 through a public-side interface 200 of another access point 20, it is necessary to interface with the authentication processes in the ISP 4

The ISP 4 may be configured so that a specific fault-reporting server 7 can be accessed directly (step 47, FIG. 4) without having to provide authentication credentials to the ISP 4 as would be the case for a request directed to a normal address. This would allow the access point 10 (which appears to the network to be like a user terminal 51, to access the system without the usual manual identification procedure needed to gain access to the ISP.

To do this the fault reporting processor 32 retrieves the network address of the server 7 from the store 39 (step 44). The access point 10 would therefore be able to make a direct report (47) to the fault-reporting processor 71 of the server 7. In order for the access point 10 making the report to be identifiable to the access control function 70 of the fault reporting platform 7, the access point 10 uses a digitally-signed key, access point dentity or an encoded form of the failed telephone number etc, also retrieved from the store 39 (step 44) In this approach, since the report server 7 is accessible without challenge, the validity of the signed key should be verified. This approach simplifies the reporting, and minimises the logic required in the access point 10, but would require that the ISP 4 be modified to allow unauthenticated access to the report server 7.

In an alternative arrangement (FIG. 5), the ISP platform 4 is unmodified, so the access point 10 has to perform a standard log-in procedure. The access point 10 is arranged to do this automatically (instead of the usual manual process) by retrieving authentication credentials 39 (step 44) which it uses to log-on to the ISP 4 (step 46) before being able to report the fault 13 via the link 8 (step 47). These credentials may be the user's personal access credentials, pre-stored in the access point 10 by the customer. Alternatively, a special account may be offered solely for this reporting purpose. The credentials for this could be stored in the firmware 39 of the access point 10 (and periodically updated remotely by the ISP) This account could be time-limited to a few minutes' activity or restricted in the sites that it authenticates, to prevent misuse of the account for other purposes.

Once the private interface 101 of the reporting access point 10 has connected to the public interface 200 of the relaying access point 20, (step 45) (and been authenticated by the ISP 4 and/or the fault reporting server 70, step 46), then the access point 20 is able to submit a report to the fault reporting function 71 of the server 7 (step 47). This could be done by an embedded HTTP client in the access point 10, making a standard HTTP GET or POST request, and passing an authentication token back to the ISP For additional security, the request may be made using HTTPS/SSL. This would firstly ensure that the fault reporting server 7 had not been spoofed or misdirected, and secondly it would encrypt the report itself, potentially preventing interception of the authentication data.

In one embodiment, the fault report 47 includes data retrieved (step 460) from the access record indicating how often the access point 10 is used for access to the internet 4, or how recently. This information can be used by a prioritising function 72 of the fault reporting sever 7 to prioritise fault reports received from different access points to determine.

After the fault report server 7 has received and validated the fault report message, it may report the status back to the access point 10, over the same connection, by way of the working connection 22, the access point 20, and the link 8 between the access points 10, 20, and then disconnect the link between the access point 10 and the server platform 7 (step 48). The reporting access point 10 then returns to the monitoring mode (step 40).

Once a wireless connection 8 between the access points 10, 20 has been established, and the fault report sent, the connection 8 may be used to relay wireless traffic received from user terminals 50, 61, 62 to the ISP 4, by way of the access points 10, 20 and the working fixed link 22. Alternatively, the access point 10 may suspend operation of its own access point functions 38, 100, forcing any user terminals 50, 61, 62 in its vicinity to seek wireless access through another route whilst the fixed connection 12 is unavailable and the wireless interface 31 is being used in terminal mode rather than the normal access point mode. Such suspension will also prevent two access points 10, 20, both of whose fixed links 12, 22 have failed, from each attempting to report its respective line fault through the other.

The access point 10 may return to normal operation after disconnecting from the service platform 7. The next time it detects a valid connection request from one of its authenticated private clients 61 (step 490), the access point 10 can generate a further message (step 491) informing the client 61 of the status of the report. The user 61 may thus be alerted that the connection 12 has failed. He may then attempt to access the wireless LAN using the access point 10, or the internet ISP 4 using the public access facility 200 of another access point 20 or by the relaying arrangement through both access points 10, 20 described above.

The detection of a connection request from a private-side user (490) may also be used to trigger a second report to the server 7. This is used by the prioritisation processor 72 to raise the priority of the fault, as the access point is now required for use by a client. As indicated in FIG. 4, this second report may be generated by repeating the fault report process 43, 44, 45, (46), 47, 48 described above.

What is claimed is:

1. A wireless access point comprising:
a wireless interface and a network interface, and
an access control system for controlling communication by way of the wireless interface, and comprising a monitor for detecting a loss of connection to a network at the network interface,
wherein the access control system is arranged to establish wireless connection through the wireless interface and a further wireless access point to a network-based service centre and to transmit a message to the service centre indicative of the loss of connection and to transmit a signal to over-ride an authentication process on messages received from the another wireless access point so that messages received from the network directed to the service centre can be forwarded without authentication.

2. A wireless access point according to claim 1, further comprising a store for authentication data allowing communication with the network-based service centre to be established automatically.

3. A method of reporting to a network-based service platform a loss of connection between a network connection of a wireless access point and a network, the method comprising:
detecting, by the wireless access point, a loss of connection at the network interface,
when detecting the loss of connection at the network interface, the wireless access point establishing wireless contact with a second wireless access point, having a second network interface, and
transmitting a predetermined fault report message to a predetermined network platform address by way of the second wireless access point and the second network interface,
wherein the fault report message is transmitted by way of a network-based access control system, the network-based access control system being arranged to normally perform an authentication process on messages received from the second wireless access point, and
wherein the network based access control system is arranged to over-ride the authentication process for messages received from the network directed to the predetermined network platform address such that the message may be forwarded without authentication.

4. A method according to claim 3, wherein the wireless access point generates authentication data for the authentication process automatically.

5. A method according to claim 3, wherein authentication data used for access to the predetermined network platform address is distinct from access data stored by the network access point for access to the network by user terminals connecting to the access point by way of the wireless interface.

6. A method according to claim 4, wherein access to the network-based access control system using the predetermined authentication data is limited to a predetermined period.

7. A method according to claim 3 wherein, following detection of a loss of connection at the network interface, when a user terminal next establishes wireless connection with the wireless access point, the wireless access point transmits a message to the user terminal over the wireless interface reporting the loss of network connection.

8. A method according to claim 7, wherein following detection of a loss of connection at the network interface, when a user terminal next establishes wireless connection with the wireless access point, a further fault report message is transmitted to the network platform address indicative of the user activity detected by the access point.

9. A method according to claim 3, in which the wireless access point stores data relating to usage of the access point, and retrieves the stored data when a loss of connection is detected and transmits the stored data with the fault report message.

* * * * *